(12) United States Patent
Grajcar

(10) Patent No.: US 9,578,705 B2
(45) Date of Patent: *Feb. 21, 2017

(54) DC LED DRIVERLESS LIGHTING ASSEMBLY

(71) Applicant: Once Innovations, Inc., Plymouth, MN (US)

(72) Inventor: Zdenko Grajcar, Orono, MN (US)

(73) Assignee: Once Innovations, Inc., Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,614

(22) Filed: Dec. 7, 2015

(65) Prior Publication Data

US 2016/0150603 A1    May 26, 2016

Related U.S. Application Data

(63) Continuation of application No. 14/483,702, filed on Sep. 11, 2014, now Pat. No. 9,210,755.

(60) Provisional application No. 61/876,293, filed on Sep. 11, 2013.

(51) Int. Cl.
*H05B 33/08* (2006.01)
*A01K 29/00* (2006.01)
*A01K 31/18* (2006.01)

(52) U.S. Cl.
CPC ............ *H05B 33/083* (2013.01); *A01K 29/00* (2013.01); *A01K 31/18* (2013.01); *H05B 33/0845* (2013.01); *H05B 33/0857* (2013.01); *H05B 33/0815* (2013.01)

(58) Field of Classification Search
USPC ................. 315/224, 247, 291, 307–326, 185 S, 315/209 R, 246
See application file for complete search history.

(56) References Cited

U.S. PATENT DOCUMENTS

| 9,210,755 B2 | 12/2015 | Grajcar et al. |
| 2008/0042588 A1 | 2/2008 | Chan et al. |
| 2011/0163680 A1 | 7/2011 | Welten |
| 2012/0223649 A1 | 9/2012 | Saes et al. |

(Continued)

FOREIGN PATENT DOCUMENTS

WO    WO-2015038720 A1    3/2015

OTHER PUBLICATIONS

"U.S. Appl. No. 14/483,702, Notice of Allowance mailed Aug. 3, 2015", 8 pgs.

(Continued)

*Primary Examiner* — Tuyet Vo
(74) *Attorney, Agent, or Firm* — Schwegman Lundberg & Woessner, P.A.

(57) ABSTRACT

A lighting assembly to be primarily used in an agricultural setting to illuminate farm animals with different colors of lighting. The assembly has a circuit for emitting light with different colored light emitting diodes that are arranged in networks of LEDs. The second and third networks are arranged in parallel to a first network of LED forming three separate current paths for lighting the LEDs. Each path has controllable impedance element arranged in series with the network of LED in that particular path and is controlled by a dynamic impedance control element that is coupled to the controllable impedance element to direct current through the individual paths of the circuit.

7 Claims, 11 Drawing Sheets

(56) References Cited

U.S. PATENT DOCUMENTS

| | | |
|---|---|---|
| 2013/0134888 A1 | 5/2013 | Grajcar |
| 2013/0200812 A1* | 8/2013 | Radermacher et al. ............ H05B 33/08 315/186 |
| 2015/0069932 A1 | 3/2015 | Grajcar |

OTHER PUBLICATIONS

"International Application Serial No. PCT/US2014/055106, International Preliminary Report on Patentability mailed Mar. 24, 2016", 5 pgs.
"International Application Serial No. PCT/US2014/055106, International Search Report mailed Dec. 18, 2014", 2 pgs.
"International Application Serial No. PCT/US2014/055106, Written Opinion mailed Dec. 18, 2014", 3 pgs.

* cited by examiner

DC LED DRIVERLESS LIGHTING ASSEMBLY

PRIORITY CLAIM

This application is a continuation of and claims the benefit of priority to U.S. patent application Ser. No. 14/481,702, filed Sep. 11, 2014, now U.S. Pat. No. 9,210,755, issued on Dec. 8, 2015, which claims the benefit of priority to U.S. Provisional Patent Application entitled "DC LED Agricultural Lighting Assembly," Ser. No. 61/876,293, which was filed on Sep. 11, 2013, the entire contents of which are incorporated herein by reference.

BACKGROUND

This invention relates to lighting assemblies. More specifically the present invention relates to circuitry for receiving a DC input for a light emitting diode assembly that changes colors through dimming.

The farming industry has greatly evolved over the past several decades, going from primarily outdoor based family farms to indoor corporate run facilities. For example, poultry are now often housed in cage systems where the chickens move from one place in the system to the next, staying off the ground where they can be harmed. In this manner the facilities house numerous poultry indoors without access to the outside.

As a result, artificial lighting is a main source of lighting for the farm animal, whether incandescent, LED, high pressure sodium, compact fluorescent or the like. As scientist have studied animals, such as chickens, turkeys, swine, cows and the like under artificial light the scientist have come to understand not only how animals see light as compared to humans, but also the effects that characteristics of light have on different animals. Many tests have been conducted related to the effects of lighting on animals such as chickens, turkeys, swine, cows and the like.

In particular, scientists have recognized that photoperiod or the modulation of light to animals is important. Swine studies exist showing that swine raised under continuous darkness for 24 hours were less active than swine raised under a modulated 12 hours of dark and 12 hours of light. Meanwhile swine under 24 hours of light were most active, but also showed increased levels of stress and thus the pigs welfare was considered to be affected by the presence of continuous darkness or light.

Similarly, another characteristic of light shown to effect animals is the irradiance or intensity of light. For example, tests in swine show that piglets raised under 2-6 or even 10 lux do not gain as much weight as compared to 70-100 lux light whereas 2500 lux light showed weight loss. Meanwhile in another test on piglets 50 lux light gave improved health and improved immune status as compared to 10, 20 40 and 120 lux light. So again, intensity of light is another light characteristic known to effect animals and swine.

A final factor that effects animals, is the spectrum or color of light. Test on poultry show that use of different wavelengths of light, such as red or blue wavelengths can result in heavier bodyweight, increased daily gain, decreased mortality, increased egg production and the like.

In addition, a need in the art exists for energy efficient lighting within agricultural facilities. In particular agricultural facilities can contain 50, 100 or more lights depending on the size of the facility. Typically these facilities contain 100 Watt incandescent light bulbs that are a drain on energy and cause power bills to be tremendous. In addition, because of the environment there is an abundance of feces, ammonium, mud, food pieces and the like within the barn. Thus, typically the 100 Watt bulbs must be within a casing or jelly jar of some type to try to protect the lighting from the elements. In addition wash downs expose the lighting to water, again requiring protection for the lighting to prevent breakage, shortage or worse fire conditions.

As a result of this research, agricultural lighting manufacturers have begun manufacturing lighting that present different spectrum of light, such as red or blue to enhance production of the animals. For example U.S. Ser. No. 13/050,910 entitled Light Sources Adapted to Spectral Sensitivity of Diurnal Avians and Humans to Grajcar that is incorporated in full herein is directed toward light emitting diode (LED) lighting assemblies that can be dimmed in order to provide different wavelengths of light. Thus an assembly can start off red and be dimmed to appear blue or vice versa to accommodate the animal. Similarly, U.S. Ser. No. 13/357,330 entitled Differential Illumination to Select Egg Laying Sites to Grajcar that is also incorporated in full herein provides for an aviary system for egg laying with similar concepts.

Still problems remain. In particular, the circuitry presented in these applications are directed toward an AC power sources where on occasion a DC based power source is presented as an input. Additionally, occasionally AC power sources can cause flickering and other unintended consequences. Therefore a need in the art exists for an agricultural light that is able to provide growth enhancements through color shifting, yet operates on a DC power supply.

Therefore a principle object of the present invention is to provide a DC circuit that provides color shifting properties.

Another object of the present invention is to provide a robust, cost effective agricultural lighting assembly.

These and other object, advantages and features will become apparent from the rest of the specification.

OVERVIEW

A lighting assembly that receives DC (direct current) input that is modified by a dimming device. The lighting assembly has a circuit to receive the DC input that includes in a first path a first network of light emitting diodes that having a first color characteristic and a second path having a second network of light emitting diodes that have a second color characteristic arranged in parallel to the first network of light emitting diodes. A controllable impedance element is arranged in series with the first network of light emitting diodes and when used in combination with at least on dynamic impedance control element to switch the flow of current from the first path to the second path.

DETAILED DESCRIPTION

Figure 1:
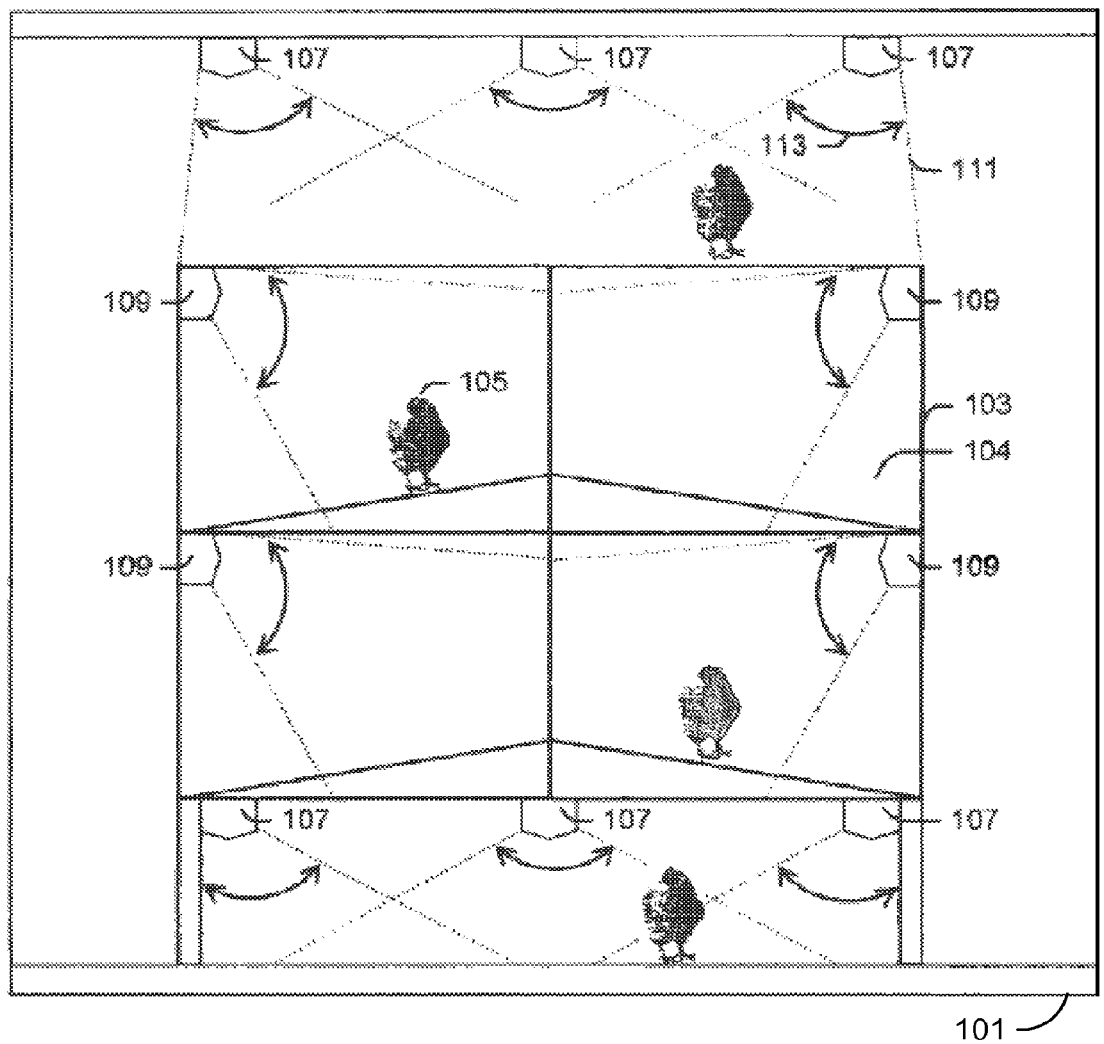
FIG. 1 shows a cross-sectional view of an enclosure containing an aviary system and having a differential illumination system.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Egg production facilities are highly mechanized, and typically include systems for automatically retrieving eggs laid by the chicken, poultry, or other animals promptly after the eggs have been laid. The egg retrieval systems are designed to retrieve eggs from nests or other areas specially designed for laying eggs. Animals typically like to lay eggs in areas that are dark and closed off. Nests are therefore generally designed to be dark and partially closed off (while still maintaining open access for the animals), so as to encourage animals to lay eggs in them.

While a large proportion of eggs are laid in nests or other designated egg laying areas, many eggs are laid outside of these areas. In caged facilities, eggs may be laid in non-nest areas of a cage. In cage-free facilities, eggs may be laid in non-nest areas of an aviary system, or in non-nest areas of an enclosure containing the aviary system. While some egg retrieval systems retrieve eggs from non-nest areas that house animals, such systems do not retrieve all of the mislaid eggs and at least some of these eggs are typically lost.

Behavioral and physiological studies show that animal behavior is influenced by exposure to light in general, and to particular wavelengths of light in particular. For example, exposure to red light (or to light having a red hue) can increase the growth rate of chickens and turkeys at the beginning of the rearing period, increase locomotion that helps minimize leg disorders in the late rearing period, stimulate and promote sexual activity, and reduce feed consumption per egg laid with no differences in egg size, shell weight, shell thickness, or yolk and albumen weights. However, the exposure to red light (or to light having a red hue) can promote cannibalism in broilers. On the other hand, exposure to green and blue light (or to light having green or blue hues) can significantly enhance the animals' growth rate at an early age by enhancing proliferation of skeletal muscle satellite cells, enhance growth at a later age by elevating plasma androgens (in the case of blue light), promote myofiber growth due to more effective stimulation of testosterone secretion, reduce locomotion (in the case of narrow band blue light), and reduce cannibalism rates at late age in broilers (in the case of narrow band blue light).

Light, and more particularly the color or spectrum of light, may therefore be used to influence the behaviors of animals. As used herein, light generally refers to electromagnetic radiation, and more particularly to radiation having wavelengths in the range of 300 to 800 nm. The human eye is sensitive to radiation having wavelengths in the range of 400 to 700 nm, with a peak of sensitivity at around 550 nm (corresponding to green light). However, domestic fowl are sensitive to a broader range of wavelengths both through their eyes, and through their skulls using receptors located in the pineal gland and in the hypothalamus. In particular, domestic fowl are sensitive to light having wavelengths in the range of 300 to 800 nm. Domestic fowls have peak sensitivities to light having wavelengths of around 480 nm (corresponding to blue light), 570 nm (corresponding to green-yellow light), and at 630 nm (corresponding to red light). As such, we refer to light as any radiation in a range of 300 to 800 nm to which animals are visually sensitive (e.g., through eyes) or physiologically sensitive (e.g., through other receptors, such as receptors in the pineal gland and hypothalamus), including radiation commonly referred to as ultra-violet (UV) and infrared (IR).

Light can have different spectrums or spectral contents depending on the particular mixture and relative intensity of wavelengths included in the light. For example, white light (such as natural daylight) generally has a spectrum including a mixture of radiations from 300 to 800 nm at relatively similar intensities. Red light (or redish light) has a spectrum predominantly (or only) including radiation having wavelengths in the "red" range of 635-700 nm (and more generally, wavelengths over 620 nm). Blue light (or bluish light) has a spectrum predominantly (or only) including radiation having wavelengths in the "blue" range of 450-490 nm (and more generally, wavelengths below 500 nm). Green light (or greenish light) has a spectrum predominantly (or only) including radiation having wavelengths in the "green" range of 490-560 nm. A light spectrum predominantly includes radiation of a particular wavelength or range of wavelengths if the relative luminous power (or energy content) of those particular wavelength(s) is higher than the luminous power (or energy content) of other wavelengths in the light spectrum. However, a light that is substantially of a given color can including radiation having a range of wavelengths of the given color, as well as radiation of other wavelengths.

An egg production or other animal facility, such as a cage-free egg production facility, includes a set of enclosures. Each enclosure can be a room, a pen, a corral, a fenced area, a cage, or the like, which houses a group of animals. Animals are able to move within one enclosure, but are generally restricted from moving between different enclosures. Different areas or volumes within the enclosure can be designated for particular uses. For example, a feeding area may be designated around a feeder or other food source in the enclosure, and a watering area may be designated around a water source. Light sources, such as lamps or bulbs, can be installed in or around the enclosure to illuminate different areas of the enclosure. In some examples, directional light sources are used to concentrate, focus, or contain the illumination from each light source within a particular area of the enclosure.

The light sources in the enclosure can produce light with different spectrums, so as to illuminate particular areas of the enclosure with different colored light. The color or spectrum of each light source can be selected so as to promote or encourage certain behaviors in particular areas of the enclosure, and/or to hinder or discourage the same or other behaviors in other areas of the enclosure. For example, a first light source having a spectrum selected so as to encourage feeding may be used to illuminate a feeding area of the enclosure. Additionally or alternatively, a second light source having a spectrum selected so as to encourage egg laying may be used to illuminate a nesting area of the enclosure. The color or spectrum of each light source can also be selected so as to promote or encourage certain behaviors at certain times, and/or to hinder or discourage behaviors at other times. For example, a first light source having a spectrum selected so as to encourage feeding may be used to illuminate all or part of the enclosure at a feeding time (e.g., during a particular time-period every day). Additionally or alternatively, a second light source having a spectrum selected so as to encourage cannibalism at a late age may be used to illuminate all or part of the enclosure when the animals in the enclosure reach the late age.

FIG. 1 shows a cross-sectional view of an enclosure 101 containing an aviary system 103 for housing animals. The enclosure 101 may be one of many enclosures included in an egg production facility and having a differential illumination system 100. Each enclosure 101 houses a group of animals that can move within the enclosure, but are restricted from moving between different enclosures. The enclosure 101 includes one or more aviary systems 103 located within the enclosure. The chicken 105 or other poultry or animals housed in the enclosure 101 can move freely between the enclosure 101 and the aviary system 103 through one or more openings in the aviary system 103.

An aviary system 103 is a structure for housing chicken 105 or other poultry or animals in an interior volume 104 thereof, and for providing various services to the chicken. The aviary system 103 can include supply lines, augers, and/or belt conveyors for conveying inputs to and outputs from the system. For example, the aviary system 103 can supply feed, water, and/or light to the chicken, and can remove litter and recover eggs laid by the chicken. The interior volume 104 of the aviary system 103 can thus include different areas or systems designed or designated for different purposes. For example, the aviary system 103 can include a nest area for laying eggs, one or more feeding or drinking areas for providing food or water to the chicken, one or more roosting areas, or the like.

The enclosure 101 may also include different areas or systems designed or designated for different purposes. For example, the enclosure 101 can include a scratching area, located for example on a floor of the enclosure 101 (e.g., a portion of the floor located underneath the aviary system 103, a portion of the floor located next to or around the aviary system, in an aisle between two or more aviary systems 103, or the like), on top of an aviary system 103 within the enclosure 101, outside of a barn in a case in which the enclosure 101 includes an outdoor section, or the like. The scratching area may be designed for use in scratching, pecking, and/or dust bathing. In some examples, the enclosure may additionally or alternatively include one or more perches or roosting areas separate from the aviary system 103.

Various light sources 107, 109 may be installed to provide illumination in the enclosure 101 and in the aviary system 103. The light sources 107, 109 may be incandescent bulbs, fluorescent lights, light-emitting diode (LED), or other suitable lamps. Each light source 107, 109 produces light with a particular spectrum or selection of radiation wavelengths. Each light source 107, 109 illuminates a designated area of the enclosure 101 and/or aviary system 103. In the example of FIG. 1, for instance, the light sources 107 are located in the enclosure 101 (but outside of the aviary system 103), and are located and oriented so as to illuminate areas located above the aviary system 103 and underneath the aviary system 103. In the example, the light sources 109 are located within the aviary system 103 (e.g., on each of two or more levels within the aviary system), and are located and oriented so as to illuminate areas located within the internal volume 104 of the aviary system 103.

In some examples, the light sources 107, 109 may be directional light sources. Directional light sources produce a directed beam 111 of light having a given width or angle 113 (e.g., a beam angle less than 60 degrees), and are designed to predominantly (or only) provide illumination in a given direction or location. In the example of FIG. 1, for instance, the directional light sources 107 are designed (and mounted and oriented) to concentrate their illumination on an upper surface above the aviary system 103, and in a floor region located underneath the aviary system 103, so as to minimize or avoid the illumination from the sources 107 from penetrating inside of the aviary system 103 (e.g., the light sources 107 are directed away from openings between the internal volume of the aviary system and the enclosure). Conversely, the directional light sources 109 are designed (and mounted and oriented) to concentrate their illumination within the aviary system 103, so as to minimize or avoid illumination from the sources 109 from penetrating outside of the aviary system 103 (e.g., the light sources 109 are directed away from openings between the internal volume of the aviary system and the enclosure).

Each light source 107, 109 produces light with a particular spectrum or selection of radiation wavelengths. As a result, one light source (or group of light sources) can produce light having one color or spectrum, while another light source (or group of light sources) can produce light having a different color or spectrum. Additionally, a single light source (or group of light sources) can selectively produce light having a different color or spectrum at different times (e.g., the light source can be controlled to produce light of one color now, and to produce light of a different color at another later time). The light sources 107, 109 may also be dimmable, such that the intensity of illumination produced by a light source can be selected or changed. Additionally, a single light source can selectively produce light having a different color at different dimming levels (e.g., the light can produce a white light at high lighting intensities, and a redish light when dimmed to a lower lighting intensity). The color (or spectrum) and intensity of a group of multiple light sources may be controlled together: as such, all light sources 107 providing illumination outside of the aviary system 103 may be controlled together (such that they all provide a similar color and intensity of lighting), while all light sources 109 providing illumination inside of the aviary system 103 may be controlled together.

The light sources 107 and 109 may thus be used to encourage (promote) or discourage certain behaviors of chicken located in the enclosure 101 and in the aviary system 103 by causing the light sources to produce light with different spectrums.

Figure 2:
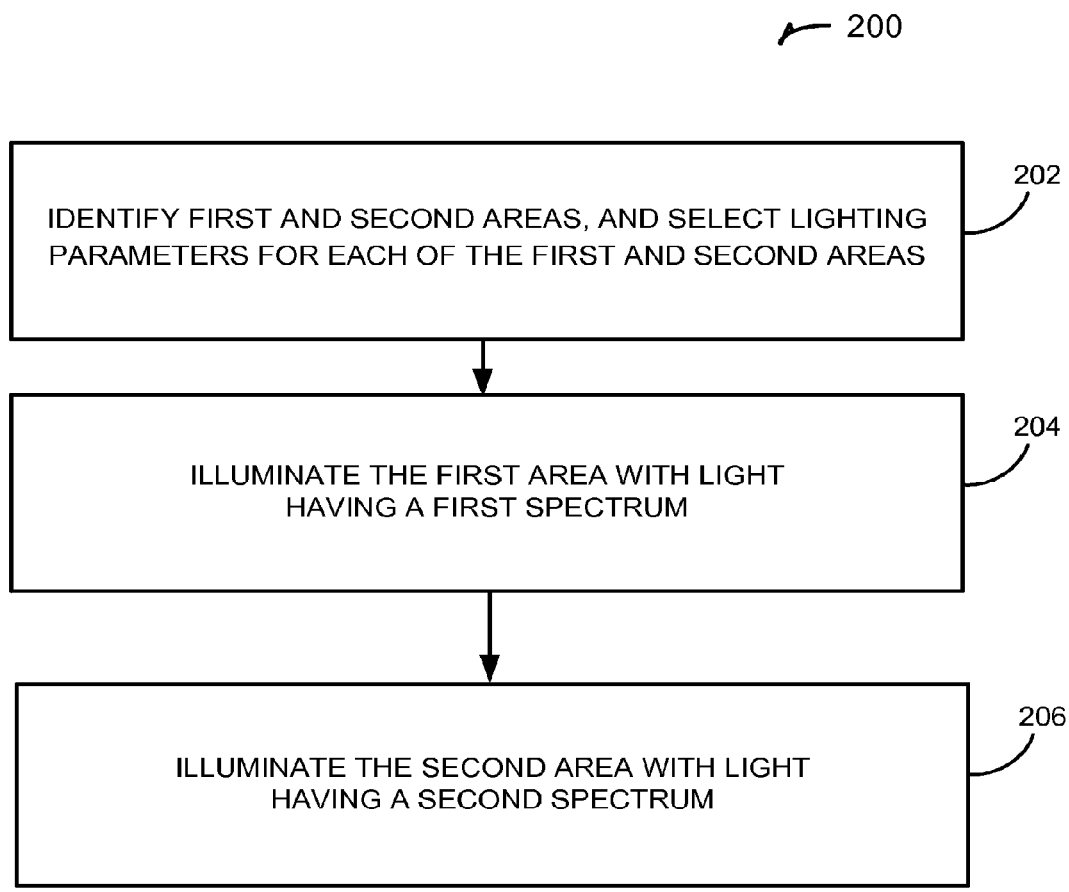
FIG. 2 is a flow chart illustrating a method for controlling lighting and illumination in order to provide differential illumination.

FIG. 2 is a flow chart illustrating a method 200 for controlling lighting and illumination, and in particular for providing differential illumination to control or affect animal behavior. The method 200 begins in operation 202 by identifying two or more areas in which to provide differential lighting. In one example, first and second areas may respectively correspond to an area forming part of an enclosure having an aviary system located therein, and an area forming part of an internal volume of the aviary system.

Operation 202 may further include selecting lighting parameters for each of the identified areas. Lighting parameters can include lighting state (on/off), lighting intensity, and lighting color or spectrum. The lighting parameters may be constant parameters, or time-varying parameters. For example, time-varying parameters may provide for variations in lighting intensity and/or color at different times of day, of week, of month, or of year. The time-varying parameters may further provide for variations in lighting intensity and/or color based on an age of animals in the enclosure or aviary system. In the example, light having a first spectrum may be selected for the first area, while light having a second spectrum different from the first spectrum may be selected for the second area.

In operations 204 and 206, the first and second areas are respectively illuminated with light having the first and second spectrums. In the example, the first area may be illuminated with light having a first spectrum having a higher red component than the second spectrum, while the second area may be illuminated with light having a second spectrum having a higher blue component than the first spectrum. Operations 204 and 206 may further include dimming or increasing the lighting intensity of the light in one or both of the areas, or changing the spectrum composition of the lighting in one or both of the areas.

In a first example, the light sources 109 produce red light (e.g., substantially red or redish light) having a higher red component than the light produced by the light sources 107, so as to encourage the animals to roost, feed, and/or lay eggs inside the aviary system 103. Conversely, the light sources 107 produce blue light (e.g., substantially blue or blueish light) having a higher blue component than the light produced by the light sources 109, so as to discourage the animals from roosting and laying eggs outside of the aviary system 103.

In a second example, the light sources 109 produce a substantially red light having a first intensity, and the light sources 107 produce a substantially blue light having a second intensity. In order to encourage the chicken to gather inside the aviary system at dusk, the light sources 109 may initially be dimmed to produce a substantially red light having a third intensity lower than the first intensity. As the light sources 109 are dimmed, the spectrum of the light sources may change so as to increase the relative intensity of red light within the spectrum. The intensity of the lighting from the light sources 107 may be sustained temporarily to encourage the chicken to move into the dimmed or darkened aviary system 103. The intensity of the lighting from the light sources 107 may be reduced only at a later time, for example when the chicken have had a chance to move into the aviary system 103 for the night.

In a third example, the light sources 109 produce a substantially red light having a first intensity, and the light sources 107 produce a substantially blue light having a second intensity. In order to encourage the chicken to move out of the aviary system 103 (e.g., to enable the aviary system 103 to be cleaned), the light sources 107 may transition to produce a substantially red light while the light sources 109 transition to produce a substantially blue light. The blue light produced by the light sources 109 inside of the aviary system 103 may encourage the chicken to move out of the aviary system 103, while the red light produced by the light sources 107 in the enclosure 101 may encourage the chicken to rest in the enclosure 101.

Figure 3:
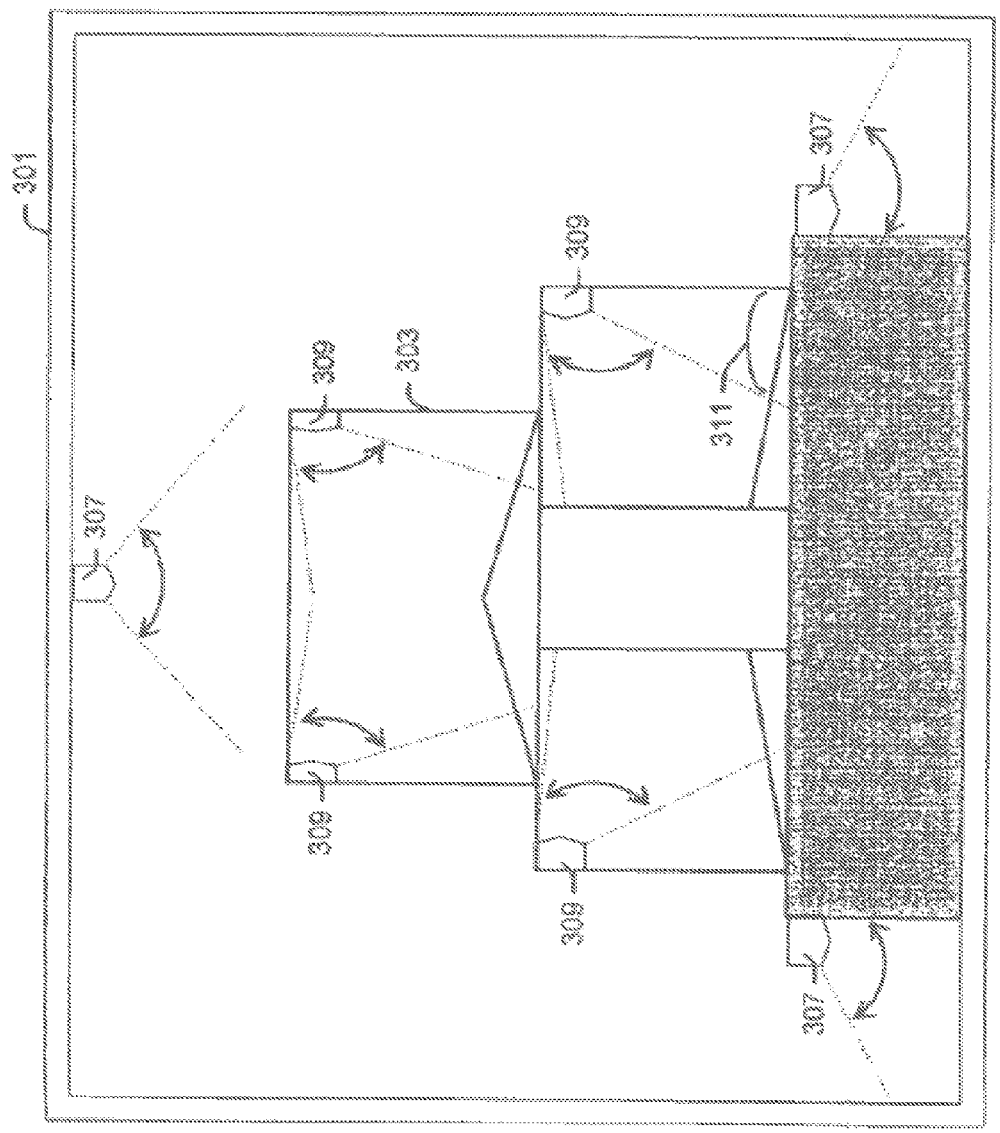
FIG. 3 shows a cross-sectional view of an enclosure containing an aviary system and having a differential illumination system.

FIG. 3 shows a cross-sectional view of a second enclosure 301 containing one or more aviary systems 303 for housing animals. In the example of FIG. 3, light sources 307 provide illumination having a first spectrum (e.g., a blue light spectrum) to at least some areas in the enclosure 301, such as areas located above or on top of the aviary system 303, and floor areas located next to or around the aviary system 303. The first spectrum may be selected to substantially reduce or eliminate egg laying in the areas illuminated by the light sources 307. Light sources 309 provide illumination having a second spectrum (e.g., a red light spectrum) to at least some areas within the aviary systems 303. The second spectrum may be selected to encourage or promote egg laying in the areas illuminated by the light sources 309. Some areas 311 within the aviary system 303 may receive substantially no illumination, or may receive no direct illumination from directional light sources 307 or 309.

Figure 4:
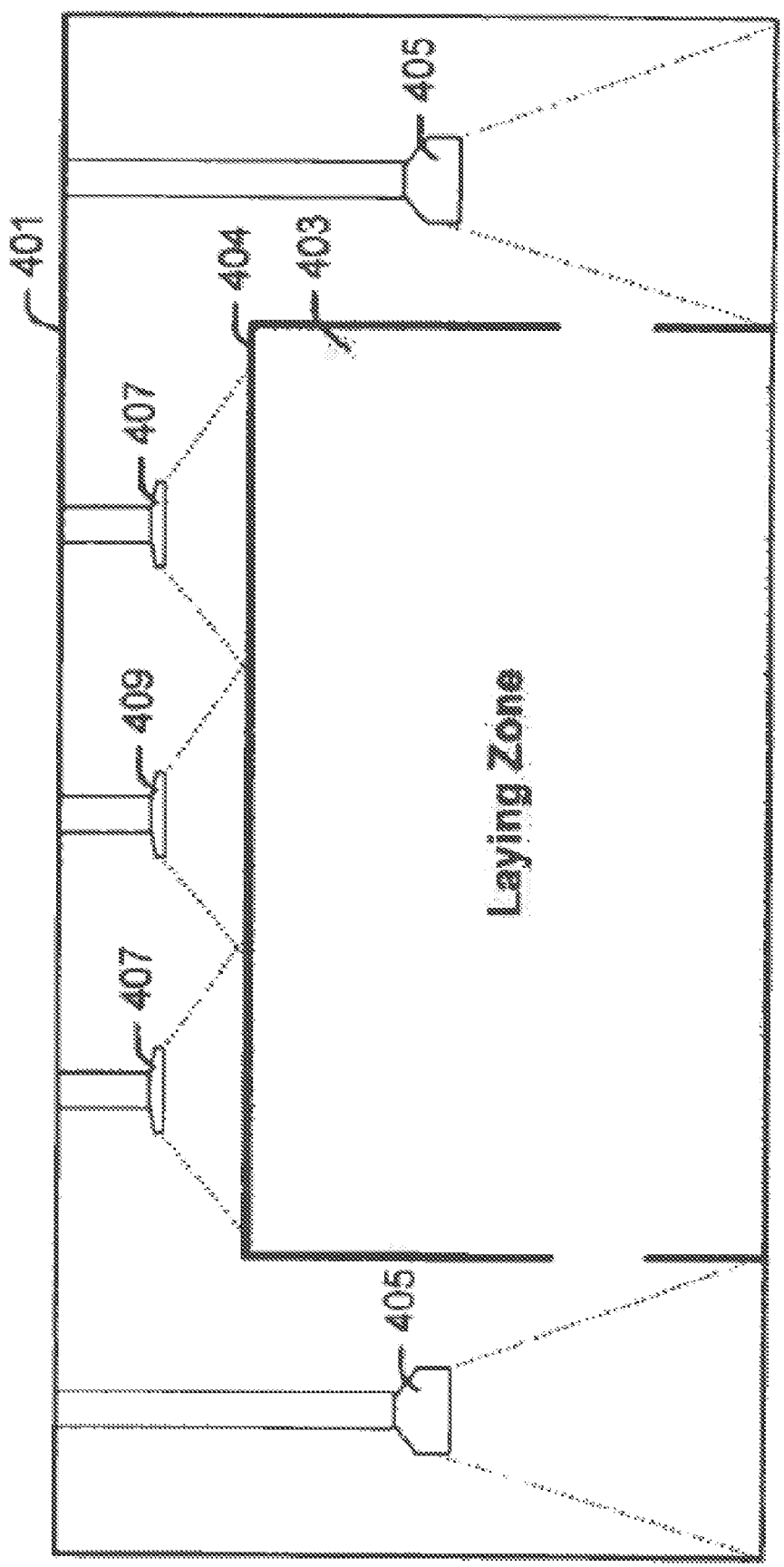
FIG. 4 shows a cross-sectional view of an enclosure containing an egg laying zone and having a differential illumination system.

FIG. 4 shows a cross-sectional view of a third enclosure 401 containing one or more egg laying zones 403. In the example shown, the enclosure 401 may alternatively correspond to an aviary system. The enclosure 401 includes various light sources 405, 407, and 409, which may each provide illumination having the same or different spectrums. For instance, light sources 405 may produce light with a first spectrum for encouraging scratching behavior, while light sources 407 and 409 may produce light with a second spectrum for encouraging roosting behavior. At least portions of the egg laying zone 403 may be surrounded by an opaque or substantially opaque barrier 404 which is used to limit the amount of illumination from the light sources 405, 407, and 409 which penetrates within the egg laying zone 403.

Figure 5:
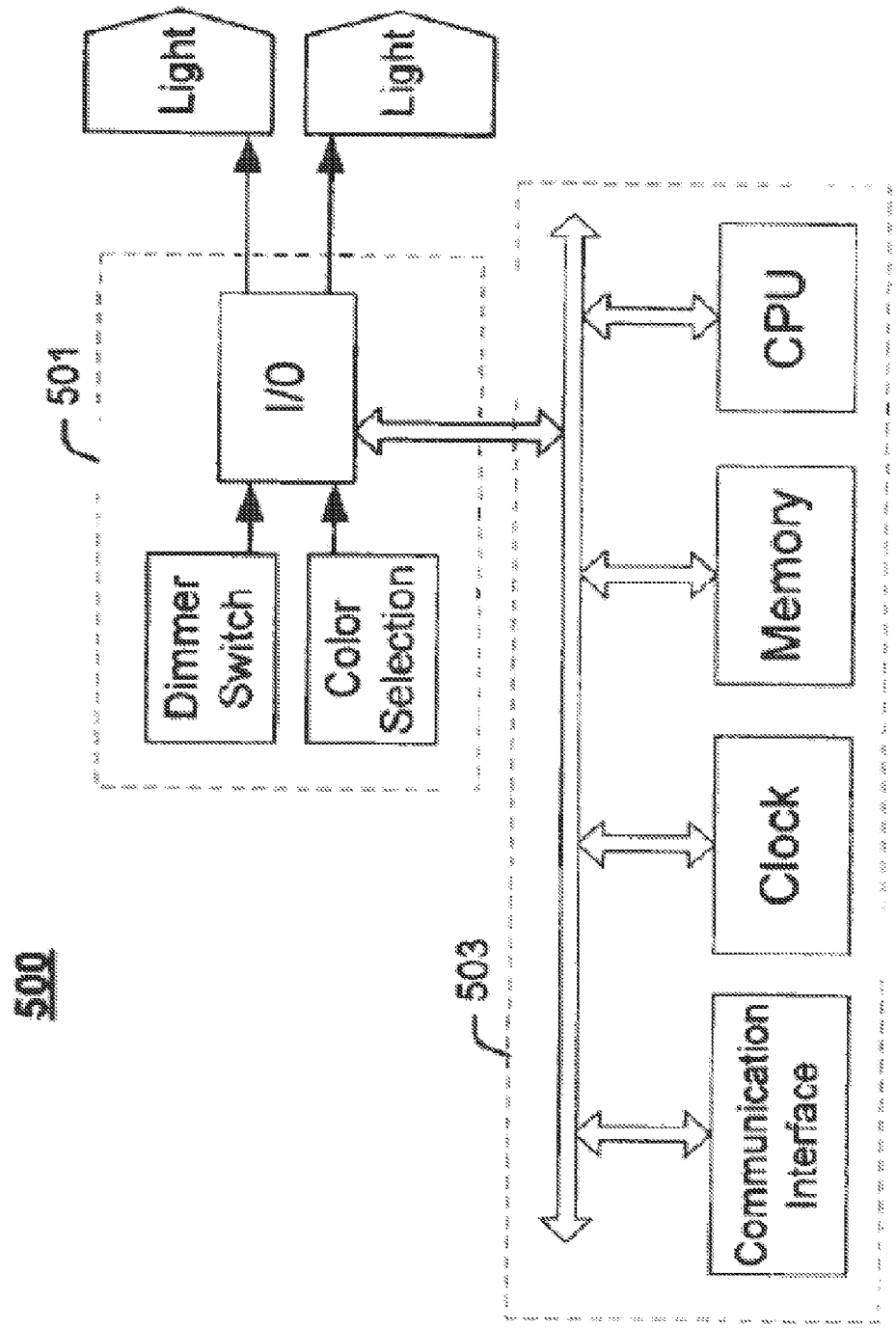
FIG. 5 shows a control system for controlling lighting and illumination produced by a differential illumination system.

FIG. 5 shows a control system 500 for controlling lighting in an egg production facility having a differential illumination system, such as system 100. The control system 500 can include various manual controls 501 to enable the lighting state (on/off), lighting intensity, and lighting color or spectrum to be selected for one or more light sources. For example, the manual controls may include a dimmer switch or module, a color selection switch or module, and other switches or modules to control one or more light sources.

The control system 500 can additionally or alternatively include automated controls to manage the lighting state of light sources. A processing system 503 can perform partially automated or fully automated control of one or more light sources, and can include one or more processors or CPUs, one or more memories, a clock, and a communication interface (e.g., network interface, user interface, and/or the like). The memory can be a non-transitory machine readable medium storing machine readable instructions for execution by the one or more processors, including instructions for selectively controlling light sources as described herein.

A reference to an element in the singular is not intended to mean. "one and only one" unless specifically so stated, but rather "one or more." For example, a light source may refer to one or more light sources, an aviary system may refer to one or more aviary systems, a light or light spectrum may refer to one or more lights or light spectrums, a control signal may refer to one or more control signals, and a signal may refer to differential voltage signals. Unless specifically stated otherwise, the term "some" refers to one or more.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

In one aspect of the disclosure, when actions or functions are described as being performed by an item (e.g., producing, selecting, controlling, illuminating, determining, providing, generating, or any other action or function), it is understood that such actions or functions may be performed by the item directly or indirectly. In one aspect, when an element or module is described as performing an action, the element or module may be understood to perform the action directly. In one aspect, when an element or module is described as performing an action, the element or module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

Terms such as "top," "bottom," "front," "rear" and the like if used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

Various items may be arranged differently (e.g., arranged in a different order, or partitioned in a different way) all without departing from the scope of the subject technology.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

In addition, while described as being directed toward agricultural purposes, the circuitry and light sources 107, 109, 307 or 309 may be used in general illumination settings, including residential settings or other industrial based setting where dimming technology is presented without falling outside the disclosure of this invention.

Figure 6:
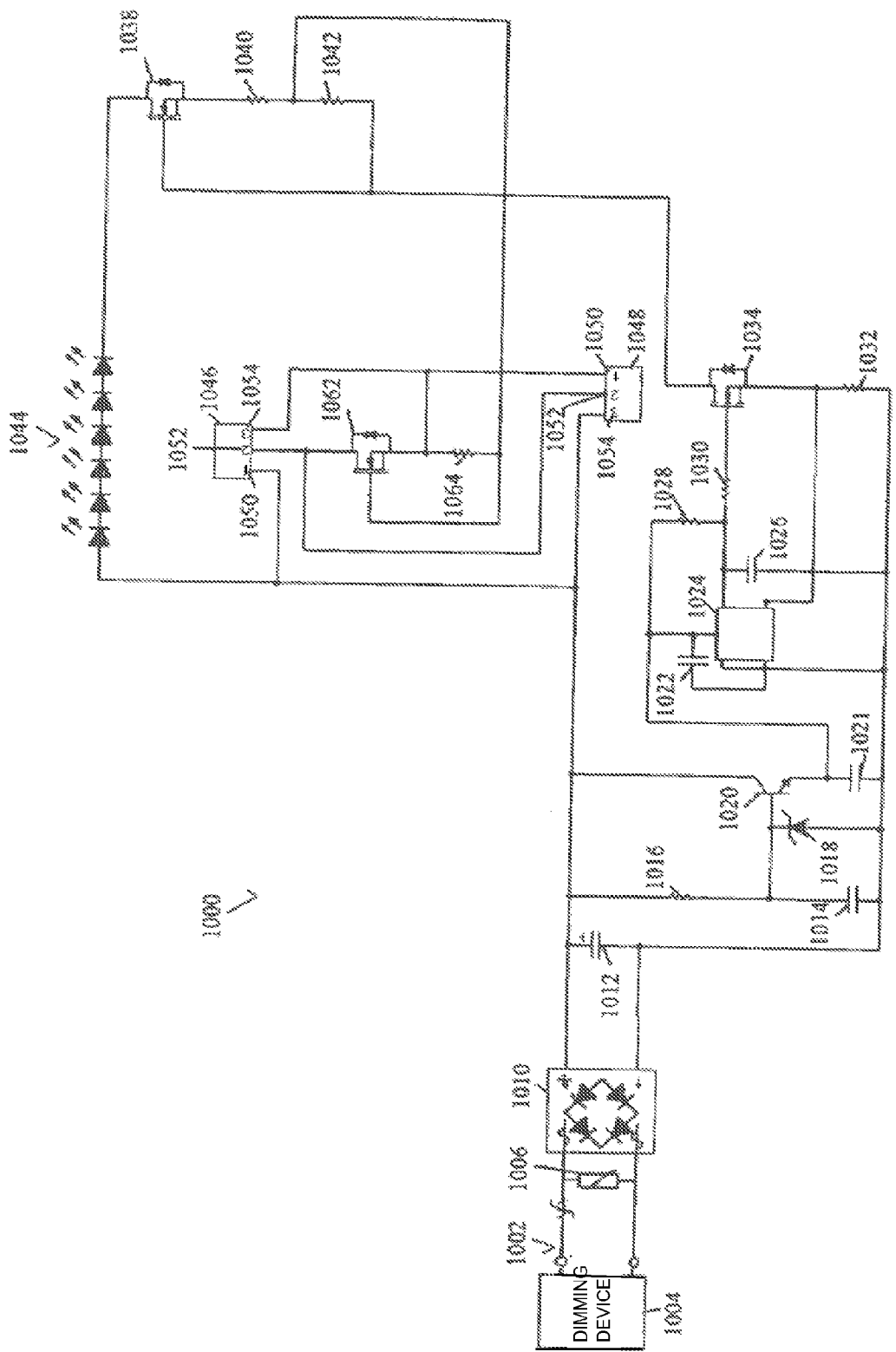
FIG. 6 is a schematic diagram of a circuit for a lighting assembly.
Figure 7:
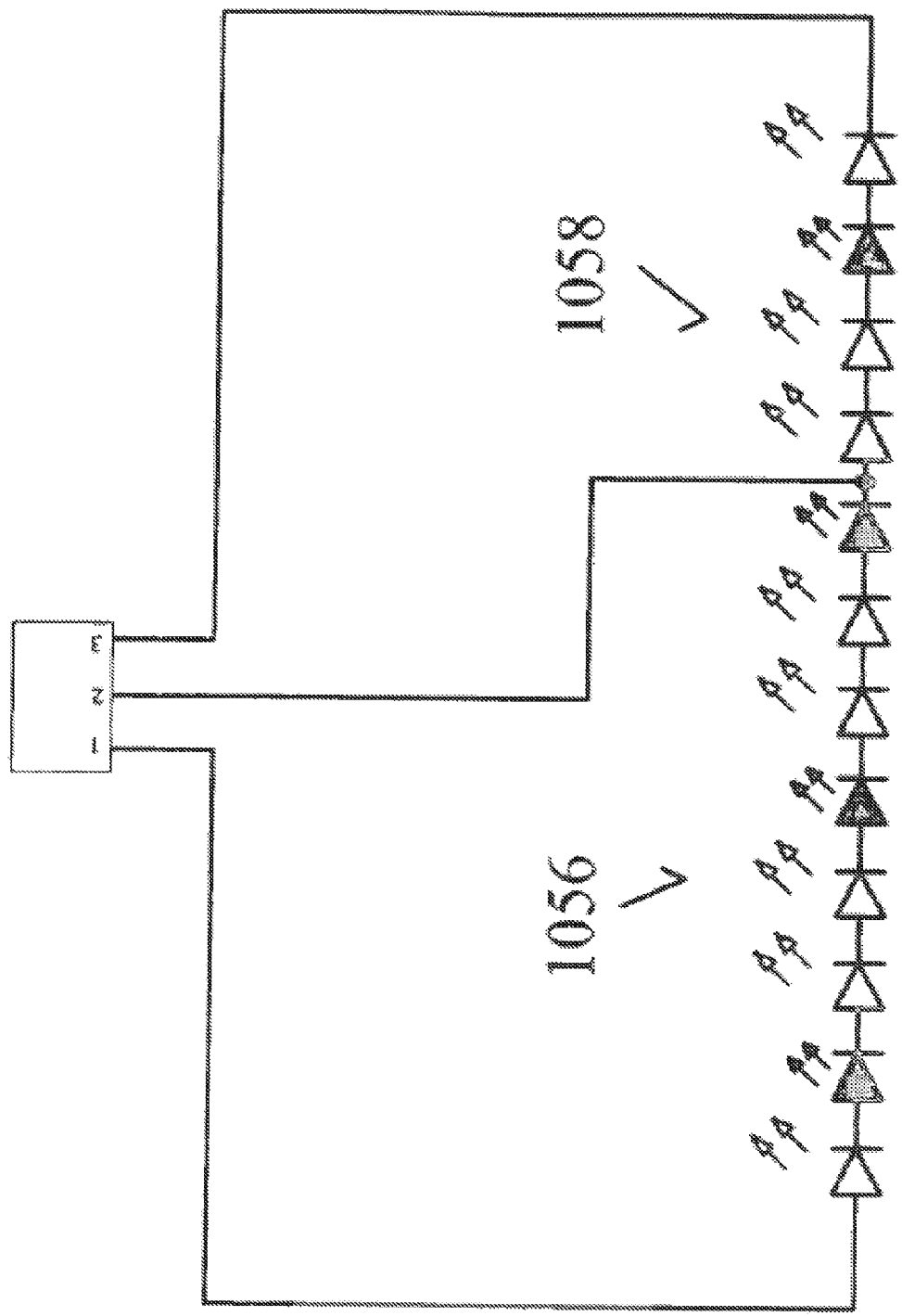
FIG. 7 is a schematic diagram of a circuit for a lighting assembly.
Figure 8:
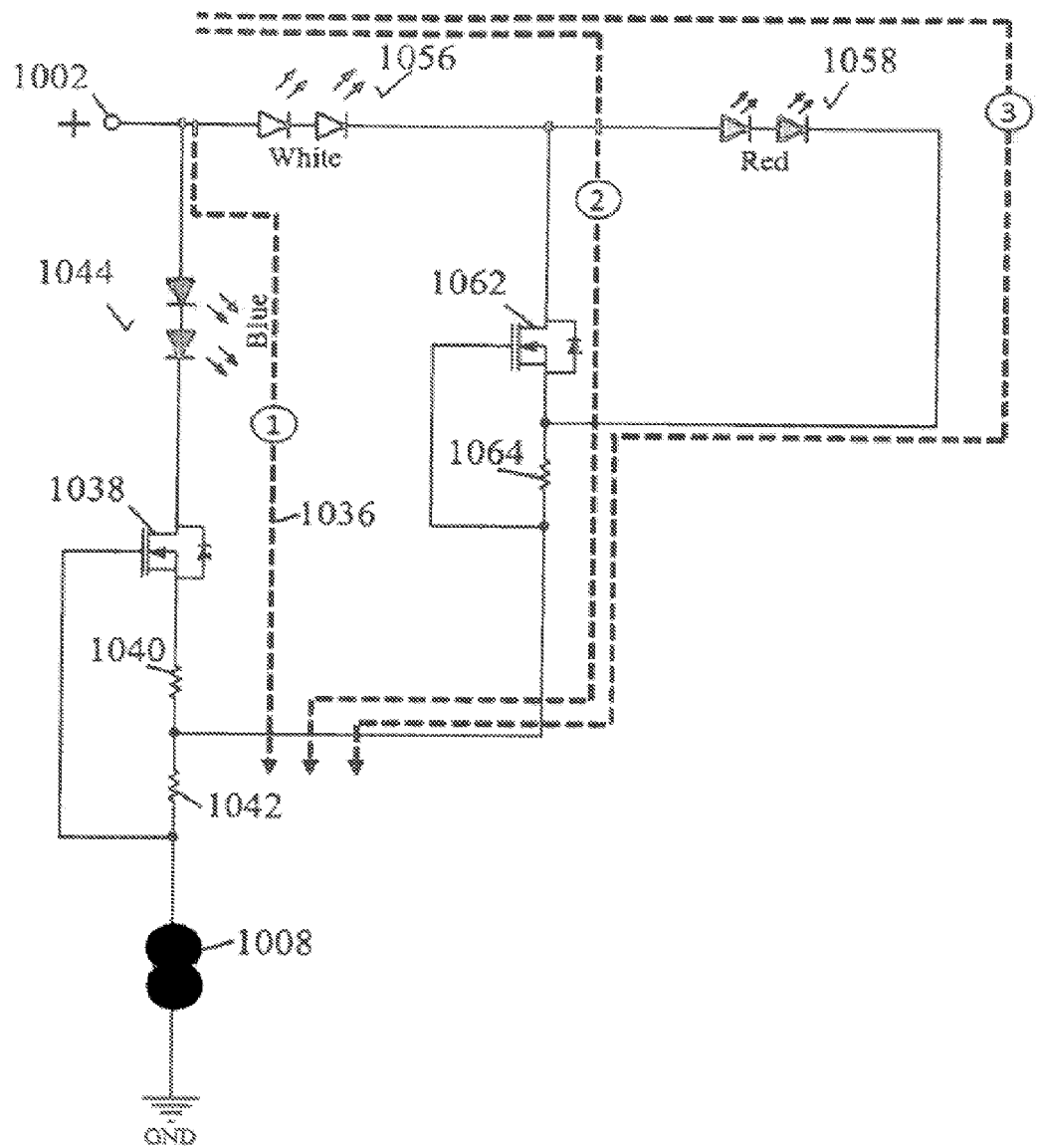
FIG. 8 is a schematic diagram of a circuit for a lighting assembly.

FIGS. 6-8 show the schematic diagrams of the driving circuitry 1000 for each individual light source 107, 109, 307 or 309. The driving circuitry 1000 of this embodiment has a DC input 1002 from a dimming device 1004. The driving circuitry 1000 additionally has protection devices 1006 such as MOVs provided for surge protection. Current sink circuitry 1008 is also provided within the driving circuitry 1000 to provide a current sink for the circuitry 1000. The current sink circuitry 1008 includes a bridge rectifier 1010 that receives the DC input and is placed in parallel to a first capacitor 1012, a second capacitor 1014 in series with a resistor 1016, a zener diode 1018 and a first transistor 1020 that in a preferred embodiment is a BGT (bipolar gate transistor) in series with a third capacitor 1021.

Additionally within the voltage supply circuit 1008 is a fourth capacitor 1022, a second rectifier 1024, a fifth capacitor 1026, second and third and fourth resistors 1028, 1030 and 1032 that are electrically connected to a second transistor 1034. In a preferred embodiment the second transistor 1034 is an enhancement mode MOSFET (metal oxide semiconductor field effect transistor).

The DC input 1002 supplies voltage for a first path 1036 to a first controllable impedance device 1038 that has a first threshold voltage and that is controlled by dynamic impedance control element such as first and second control resistors 1040 and 1042. In one embodiment the first impedance device 1038 can be a MOSFET, depletion mode MOSFET, IGBT, enhancement mode MOSFET or the like. In series to the first impedance device 1038 is a first series of LEDs 1044 or first network of LEDs. The first network of LEDs 1044 provide a color characteristic or predetermined color or wavelength of light and in one embodiment provides light at a wavelength between 450 to 500 nm, or blue wavelength of light.

First and second electrical connecting devices 1046 and 1048 are electrically connected to the impedance device 1038 and in one embodiment the connecting devices 1046 and 1048 are three position plated slot connectors having three separate slots 1050, 1052 and 1054. While presented as a having three separate slots, more or less slots could be presented without falling outside the scope of this invention. Each connecting device 1046 and 1048 provides an electrical connection to second and third networks of LEDs 1056 and 1058 (via P1 wherein P1 can connect to either P2 or P3). In one embodiment the second series of LEDs 1056 produce white light and the third series of LEDs 1058 have a wavelength of light in the 620 nm-750 nm or red wavelength range. The second and third series of LEDs 1056 and 1058 are in series connection to one another and the electrical connecting devices 1046 and 1048 provide a second path 1060 that is between the first controllable impedance device 1038 and the second network of LEDs 1056.

A second controllable impedance device 1062 is electrically connected between the second and third networks of LEDs 1056 and 1058 and has a second threshold voltage. A third dynamic impedance control element that in one embodiment is control resistor 1064 operates to control the second impedance device 1062 is also electrically connected the second impedance device 1062. Thus when the second threshold voltage is reached a third path 1066 is provided within the circuit.

In operation, when a dimming device 1004 is utilized to power on the light sources 107, 109, 307 or 309, when voltage is initially applied and is below the first threshold voltage of the first impedance device 1038, the current flows through the first path 1036 through the first impedance device 1038 and current is directed away from the second network of LEDs 1056. Therefore the first network of LEDs 1044 light and in the embodiment where blue colored LEDs are provided the blue LEDs increase in intensity along with the increase in voltage as a result of using the dimming device 1004. Once the first threshold voltage is reached the first impedance device 1038 is effectively turned off and current begins flowing through the second impedance device 1062 via the second path 1060. Thus current is no longer supplied to the first series of LEDs 1004 and they are effectively turned off and the second series of LEDs 1056 is turned on. As the voltage is increased the second series of the LEDs 1056 become more intense and in the embodiment where the second series of LEDs 1056 produce white light the light becomes brighter until the second threshold voltage of the second impedance device 1062 is reached.

When the voltage is increased and the second threshold voltage is reached, the second impedance device 1062 effectively shuts off and current begins flowing around the second impedance device 1062 along the third path 1066 and the third series of LEDs 1058 begin to light. In the embodiment where the third series of LEDs 1058 are red wavelength LEDs the red light begins to be produced and as the voltage is increased to full voltage with the dimmer, the red LEDs gain intensity along with the second series of LEDs 1056. At this point both the second and third series of LEDs 1056 and 1058 are providing light and increasing in intensity. Thus when the second series of LEDs 1056 are white and the third series of LEDs 1058 are red, at full intensity both white and red light are provided.

Figure 9:
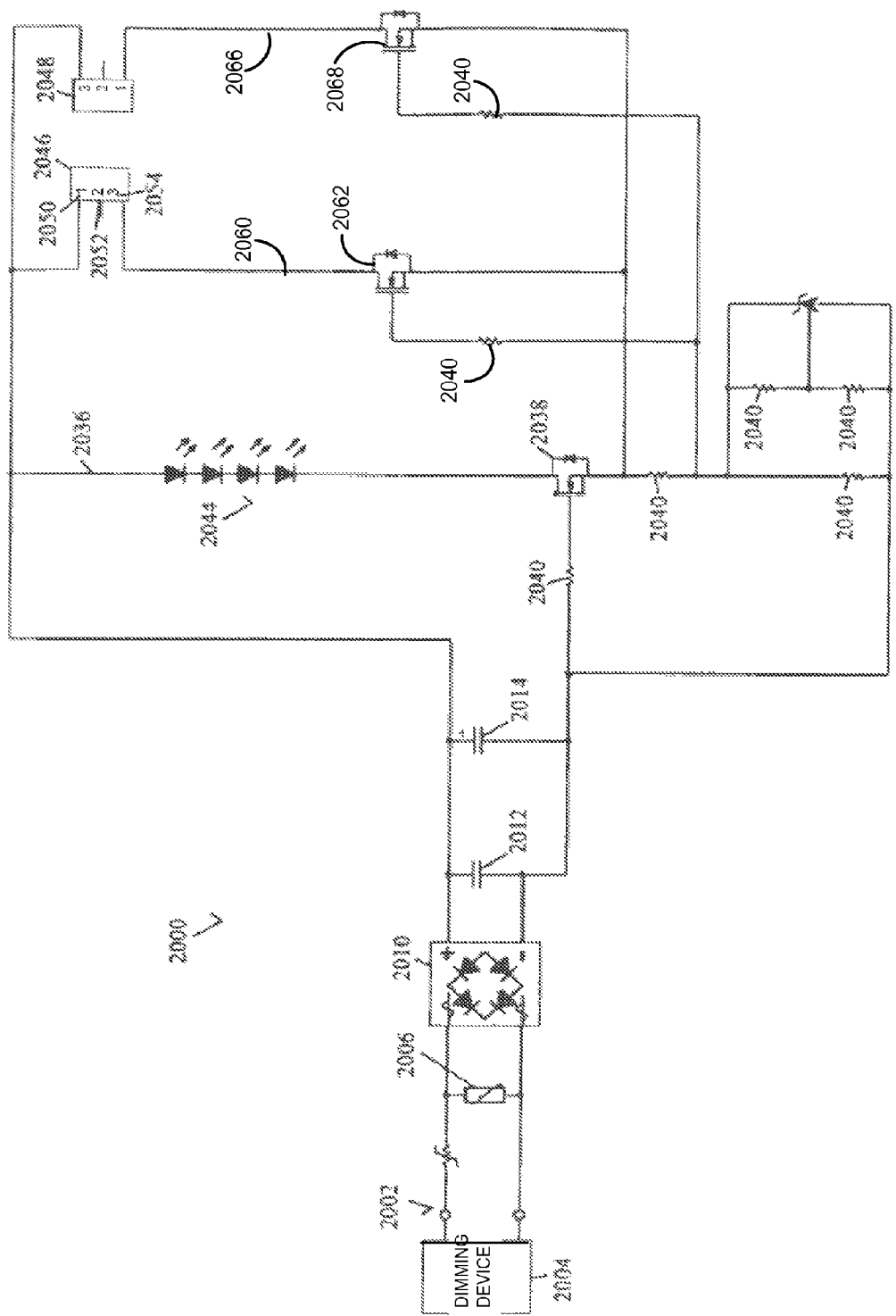
FIG. 9 is a schematic diagram of a circuit for a lighting assembly.
Figure 10:
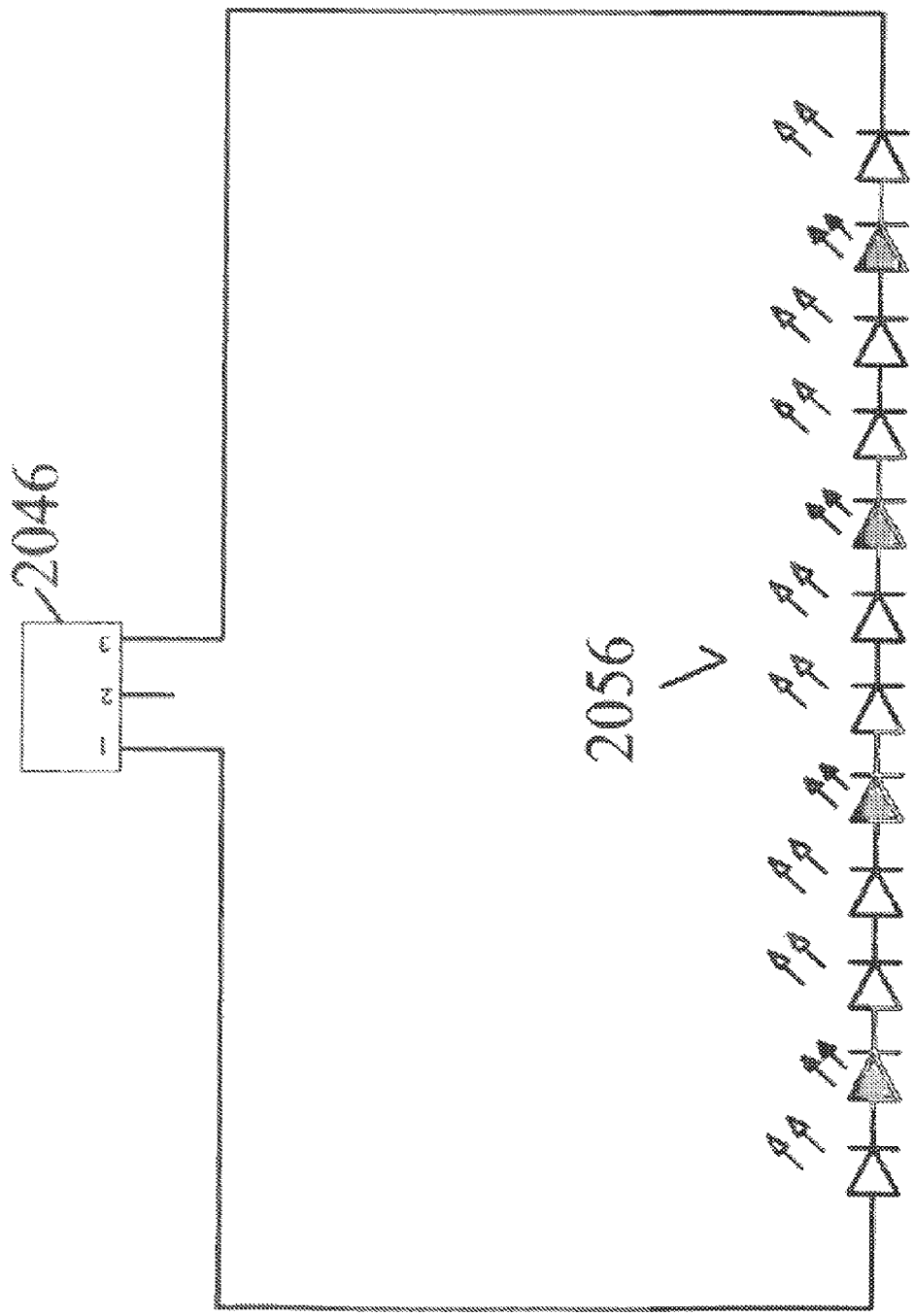
FIG. 10 is a schematic diagram of a section of a circuit for a lighting assembly.
Figure 11:
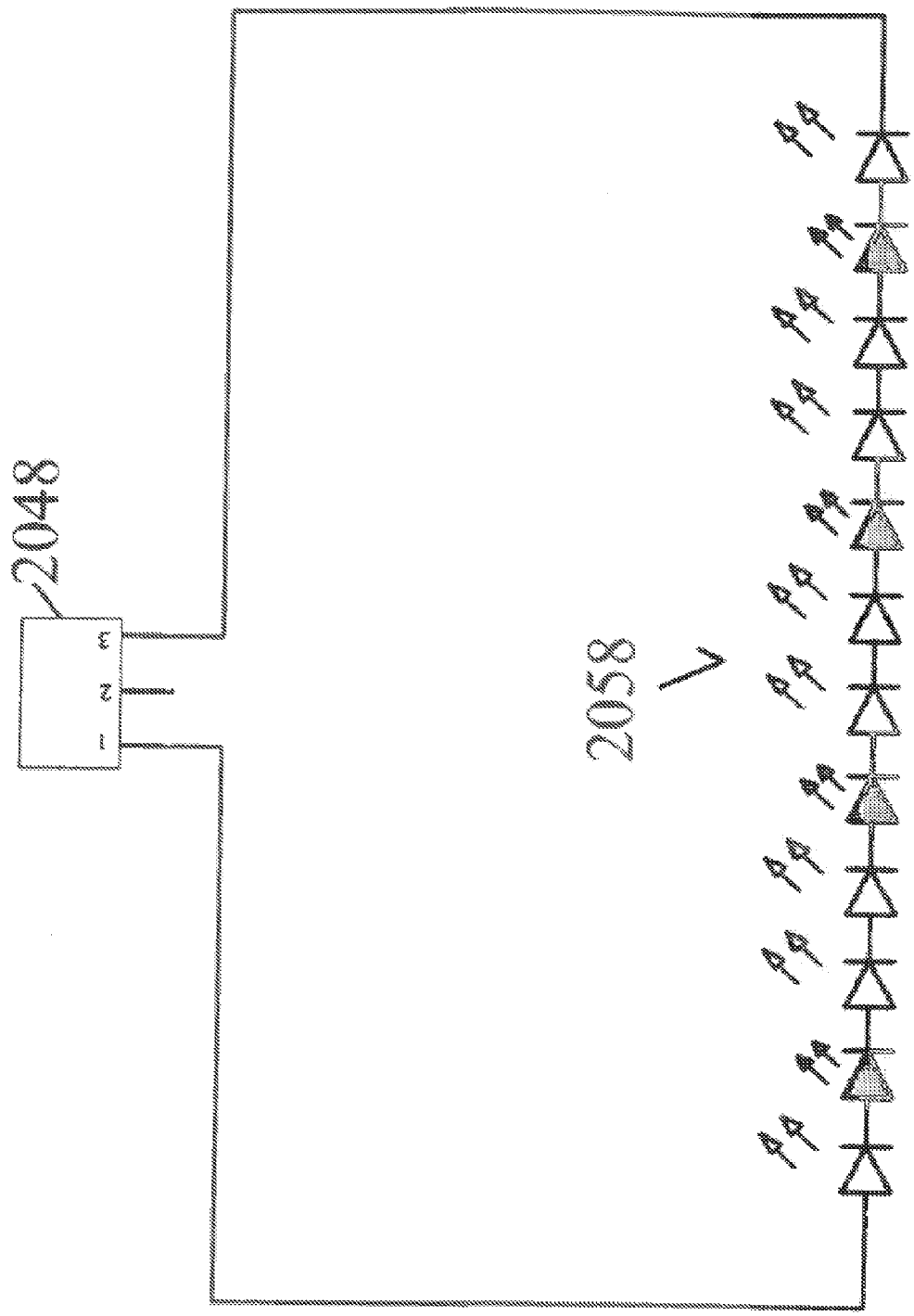
FIG. 11 is a schematic diagram of a section of a circuit for a lighting assembly.

FIGS. 9-11 show yet another embodiment of the driving circuitry 2000 for each individual light source 107, 109, 307 or 309. The driving circuitry 2000 of this embodiment again has a DC input 2002 from a dimming device 2004. The driving circuitry 2000 additionally has protection devices 2006 such as MOVs provided for surge protection. Current sink circuitry 2008 is also provided within the driving circuitry 2000 to provide a current sink 2008 for the circuitry 2000. The current sink circuitry 2008 includes a bridge rectifier 2010 that receives the DC input and is arranged in parallel with a first and second capacitor 2012 and 2014.

The DC input 2002 supplies voltage for a first path 2036 to a first controllable impedance device 2038 that has a first threshold voltage and that is controlled by dynamic impedance control elements 2040. In one embodiment the first impedance device 2038 can be a MOSFET, depletion mode MOSFET, IGET, enhancement mode MOSFET or the like. In series to the first impedance device 2038 is a first network of LEDs 2044. The first network of LEDs 2044 provide a color characteristic or predetermined color or wavelength of light and in one embodiment provides light at a wavelength between 450 to 500 nm, or blue wavelength of light.

First and second electrical connecting devices 2046 and 2048 are arranged in parallel to the first controllable impedance device 2038 and in one embodiment the connecting devices 2046 and 2048 are three position plated slot connectors having three separate slots 2050, 2052 and 2054. While presented as a having three separate slots, more or less slots could be presented without falling outside the scope of this invention. Each connecting device 2046 and 2048 provides an electrical connection to second and third networks of LEDs 2056 and 2058. In one embodiment the second network of LEDs 2056 produce white light and the third network of LEDs 2058 have a wavelength of light in the 620 nm-750 nm or red wavelength range.

By having the second network of LEDs 2056 in parallel with the first network of LEDs 2044 a second path 2060 is formed. In series connection with the second network of LEDs 2056 is a second controllable impedance device 2062 that is controlled by the dynamic impedance control elements 2040. Similarly a third path 2066 is provided similarly arranged in parallel to the first network of LEDs 2044 and having the third network of LEDs 2058. In the third path 2066 the third controllable impedance device 2068 is arranged in series to the third network of LEDs 2058 and is also controlled by dynamic impedance control elements 2040.

In operation, when a dimming device 2004 is utilized to power on the light sources 107, 109, 307 or 309, when voltage is initially applied and is below the first threshold voltage of the first impedance device 2038, the current flows through the first path 2036 through the first impedance device 2038 and current is directed away from the second and third networks of LEDs 2056 and 2058. Therefore the first network of LEDs 2044 light and in the embodiment where blue colored LEDs are provided the blue LEDs increase in intensity along with the increase in voltage as a result of using the dimming device 1004. Once the first threshold voltage is reached the first impedance device 1038 is effectively turned off and current begins flowing through the second impedance device 1062 via the second path 1060. As the voltage is increased the second network of the LEDs 2056 become more intense and in the embodiment where the second network of LEDs 2056 produce white light the light becomes brighter until the threshold voltage of the second impedance device 2062 is reached.

When the voltage is increased and the threshold voltage of the second impedance device 2062, the second impedance device 2062 effectively shuts off and current begins flowing around the second impedance device 2062 along the third path 2066 and the third network of LEDs 2058 begin to light.

Thus provided are light sources 107, 109, 307 or 309 that receive a DC input and with a dimmer the light sources 107, 109, 307 or 309 provide different spectrum of light, red, blue or otherwise, along with white light to illuminate an agricultural building. In this manner, depending on the needs of the animal housed in the building or a human in a residential or industrial setting, different wavelengths of light can be provided. Thus, at the very least all of the stated objects have been met.

What is claimed is:

1. A lighting assembly comprising:
   a first network of light emitting diodes having a first color characteristic that is adapted to receive a direct current input;
   a second network of light emitting diodes having a second color characteristic arranged in parallel to the first network of light emitting diodes;
   a controllable impedance element arranged in series with the first network of light emitting diodes; and
   a dynamic impedance control element coupled to the controllable impedance element to direct current away from the second network of light emitting diodes until a forward threshold voltage is reached.

2. The lighting assembly of claim 1, wherein the controllable impedance element is a depletion mode MOSFET.

3. The lighting assembly of claim 1, wherein the first color characteristic is blue.

4. The lighting assembly of claim 1, wherein the first color characteristic is red.

5. The lighting assembly of claim 1, wherein the first color characteristic is white.

6. The lighting assembly of claim 1, further comprising a second controllable impedance element arranged in series with the second network of light emitting diodes to divert current away from a third network of light emitting diodes.

7. The lighting assembly of claim 6, wherein the third network of light emitting diodes has a third color characteristic that is different than the first color characteristic.

\* \* \* \* \*